United States Patent
Roe et al.

(10) Patent No.: US 11,512,258 B2
(45) Date of Patent: Nov. 29, 2022

(54) CHEMICAL COMPOSITIONS AND METHODS OF USING SAME FOR REMEDIATING LOW TO MODERATE AMOUNTS OF SULFUR-CONTAINING COMPOSITIONS AND OTHER CONTAMINANTS IN LIQUIDS

(71) Applicant: GAPS TECHNOLOGY, LLC, Slidell, LA (US)

(72) Inventors: Cliffton Lee Roe, Harrison Township, MI (US); Linda Schweitzer, Rochester Hills, MI (US)

(73) Assignee: Gaps Technology, LLC., Slidell, LA (US)

( * ) Notice: Subject to any disclaimer, the term of this patent is extended or adjusted under 35 U.S.C. 154(b) by 41 days.

(21) Appl. No.: 17/080,209

(22) Filed: Oct. 26, 2020

(65) Prior Publication Data
US 2021/0040400 A1  Feb. 11, 2021

Related U.S. Application Data

(63) Continuation-in-part of application No. 16/732,559, filed on Jan. 2, 2020, which is a continuation of application No. 16/254,089, filed on Jan. 22, 2019, now Pat. No. 10,550,337, which is a continuation of application No. PCT/US2018/064015, filed on Dec. 5, 2018, which is a continuation-in-part of application No. PCT/US2018/050913, filed on Sep. 13, 2018.

(60) Provisional application No. 62/925,929, filed on Oct. 25, 2019, provisional application No. 62/702,960, filed on Jul. 25, 2018, provisional application No. 62/661,289, filed on Apr. 23, 2018, provisional application No. 62/539,699, filed on Aug. 1, 2017.

(51) Int. Cl.
| | |
|---|---|
| C10G 19/02 | (2006.01) |
| C02F 101/10 | (2006.01) |
| C10G 53/12 | (2006.01) |
| C10G 29/04 | (2006.01) |
| C10G 29/02 | (2006.01) |
| C10G 29/20 | (2006.01) |
| C02F 103/10 | (2006.01) |
| C02F 103/36 | (2006.01) |
| C02F 103/18 | (2006.01) |

(52) U.S. Cl.
CPC ............ *C10G 19/02* (2013.01); *C10G 29/02* (2013.01); *C10G 29/04* (2013.01); *C10G 29/20* (2013.01); *C10G 53/12* (2013.01); *C02F 2101/101* (2013.01); *C02F 2103/10* (2013.01); *C02F 2103/18* (2013.01); *C02F 2103/365* (2013.01); *C10G 2300/104* (2013.01); *C10G 2300/207* (2013.01); *C10G 2400/28* (2013.01)

(58) Field of Classification Search
CPC .............. C10G 19/02; B01D 2257/304; C02F 2101/101
See application file for complete search history.

(56) References Cited

U.S. PATENT DOCUMENTS

| | | | |
|---|---|---|---|
| 2,592,523 | A | 4/1952 | Ayers et al. |
| 3,262,753 | A | 7/1966 | Urano et al. |
| 3,708,421 | A | 1/1973 | Rippie |
| 3,897,219 | A | 7/1975 | Sibeud et al. |
| 4,417,986 | A | 11/1983 | Connaught et al. |
| 4,746,442 | A | 5/1988 | Calemma et al. |
| 5,635,056 | A | 6/1997 | Brons et al. |
| 7,914,669 | B2 | 3/2011 | Martinie et al. |
| 9,028,679 | B2 | 5/2015 | Morris |
| 2009/0065399 | A1 | 3/2009 | Kocal et al. |
| 2010/0056404 | A1 | 3/2010 | Talley |
| 2015/0037274 | A1 | 2/2015 | Walia et al. |

FOREIGN PATENT DOCUMENTS

EP  0 432 858 A1  6/1991

OTHER PUBLICATIONS

Shahrak, M.N. et al., "Removal of Hydrogen Sulfide from Hydrocarbon Liquids Using a Caustic Solution", article in Energy Sources Part A Recovery Utilization and Environmental Effects: Mar. 2015, pp. 791-798.

Mike Nicholson/Tim O'Brian, Baker Petrolite Corporation, "Hydrogen Sulfide in Petroleum", pp. 28 found at www.coqa-inc.org/docs/default-source/meeting-presentations/20010531H25.pdf.

Heitman et al., "Oxidation and incorporation of hydrogen sulfide by dissolved organic matter", Chemical Geology 235 (2006) pp. 12-20.

Yang et al., "Novel Process of Removal of Sulfur Dioxide by Aqueous Ammonia-Fulvic Acid Solution with Ammonia Escape Inhibition", energy&fuels article 2016, 30, pp. 3205-3218.

Pohlabein et al., "Experimental Evidence for Abiotic Sulfurization of Marine Dissolved Organic Matter", frontiers in Marine Science,, published Nov. 15, 2017, vol. 4, Article 364, pp. 1-11.

Shi et al., "Kinetic analysis of an anion exchange absorbent for CO2 capture from ambient air", Research Article Jun. 22, 2017, pp. 1-12.

*Primary Examiner* — Renee Robinson
(74) *Attorney, Agent, or Firm* — Carrier Blackman & Associates P.C.; Joseph P Carrier; Fulchand P. Shende

(57) ABSTRACT

A treatment composition for remediating for remediating $H_2S$ and other contaminant(s) in contaminated liquids, comprising: 0.1-10.0 weight % collectively of at least one hydroxide compound; 0.01-3.0 weight % collectively of at least one organic acid selected from a group consisting of fulvic acid and humic acid; 0.01-10.0 wt % of a chelating agent; and at least 75% weight of water.

14 Claims, No Drawings

CHEMICAL COMPOSITIONS AND METHODS OF USING SAME FOR REMEDIATING LOW TO MODERATE AMOUNTS OF SULFUR-CONTAINING COMPOSITIONS AND OTHER CONTAMINANTS IN LIQUIDS

CROSS-REFERENCE TO RELATED APPLICATIONS

This application nonprovisional of and claims priority to U.S. Provisional Application Ser. No. 62/925,929, filed Oct. 25, 2019, and is continuation-in-part (CIP) of and claims priority to U.S. application Ser. No. 16/732,559, filed Jan. 2, 2020, which is a continuation of and claims priority to U.S. application Ser. No. 16/254,089, filed Jan. 22, 2019, which is a continuation of International Patent Application No. PCT/US2018/064015, filed on Dec. 5, 2018; the International Patent Application No. PCT/US2018/064015 claims the benefit of priority to US Provisional Patent Application Nos. 62/661,289, filed Apr. 23, 2018, and 62/702,960, filed Jul. 25, 2018, while International Patent Application No. PCT/US2018/064015 is a continuation-in-part (CIP) of International Patent Application No. PCT/US2018/050913, filed Sep. 13, 2018, which is nonprovisional of and claims priority to U.S. Provisional Patent Application No. 62/539,699, filed Aug. 1, 2017. The entire subject matter of each of these priority applications is incorporated by reference herein.

BACKGROUND OF THE INVENTION

1. Field of the Invention

The present disclosure relates to novel, cost effective treatment compositions and treatment methods for remediating low to moderate amounts of sulfur-containing contaminants, especially $H_2S$, in various liquids, e.g., hydrocarbon based liquids such as crude oil extracted from the ground, other hydrocarbon based liquids, and so-called "produced water" which is contaminated water extracted with crude oil from the ground. More particularly, the present disclosure relates to such treatment compositions and methods in which the contaminated liquids are chemically reacted with the treatment compositions in the treatment methods in an efficient and economical manner, whereby almost all of the contaminants in the liquids are remediated down to very low levels that have been deemed safe.

2. Background

Sulfur-containing compounds including hydrogen sulfide ($H_2S$) have long been recognized as undesirable contaminants in hydrocarbon or petroleum based liquids such as crude oil and liquefied petroleum gas (LPG), as well as in contaminated aqueous solutions such as solutions extracted from the earth along with crude oil, natural gas and the like, which aqueous solutions may also be contain significant concentrations of salts and be considered brine. Herein "hydrocarbon based liquid" is used to indicated any hydrocarbon based liquid, including petroleum based liquids. Examples of hydrocarbon based liquids which may be treated with the treatment solutions and treatment methods of the present invention include those containing molecules of $CH_9$ to $CH_{32}$. $H_2S$ is a particularly undesirable contaminant because it is highly toxic, corrosive, etc. and generally petroleum based liquids such as crude oil should contain less than five ppm $H_2S$ in order to be acceptable for refining or other processing. While the amount of $H_2S$ in hydrocarbon based liquids can range from a few ppm to more than 100,000 ppm, crude oil from the ground typically contains ≤40,000 ppm $H_2S$, most often ≤2000 ppm $H_2S$, and will generally be somewhat acidic with a pH about 5 to 6. The $H_2S$ may be present in several forms, including $H_2S$ dissolved in a liquid, $H_2S$ as mercaptan sulfur and $H_2S$ content in vapor, but the majority is typically present as $H_2S$ content in vapor when the contaminated liquid is at ambient pressure or about one atmosphere, particularly at higher concentrations, and the release of $H_2S$ in vapor or gaseous form from contaminated liquids is significantly toxic and dangerous. The present invention is particularly suited for remediation of liquids containing low to moderate amounts of $H_2S$ and other sulfur containing contaminants, e.g., $H_2S$ concentrations of 2000 ppm or less, especially 500 ppm or less, which constitutes a majority of the crude oil and other hydrocarbon based and aqueous based liquids that need to be remediated.

Again, much of the $H_2S$ in a hydrocarbon based liquid, such as crude oil, is in gaseous or vapor form when the contaminated liquid is at ambient pressure. $H_2S$ gas has much greater solubility in hydrocarbon based liquids than in water, and at the high pressures at which crude oil exists underground, it is possible for the crude oil to have thousands and tens of thousands of ppm $H_2S$ therein. However, when the crude oil is brought up to ambient or atmospheric pressure much of the $H_2S$ gas therein may be released from the crude oil according to Henry's Law, and hence the need to remediate the $H_2S$ and prevent it from being released. The amount of soluble and gaseous $H_2S$ which can be in aqueous solutions is less than the amount which may be in hydrocarbon based liquids, but it still can be present in hundreds and thousands of ppm, and contaminated aqueous solutions will typically contains ≤1000 ppm $H_2S$. Generally, $H_2S$ is an acidic compound, and crude oil as extracted from the ground and containing a typical amount of $H_2S$, e.g. ≤2000 ppm, which is mostly in the form gas dissolved in the crude oil, has a moderately acidic pH of about 5-5.5. Gaseous $H_2S$ does not exist in solution above a pH of about 7.

There are many known methods for remediating sulfur-containing compounds, including $H_2S$, from crude oil and other liquids. For example, M. N. Sharak et al., *Removal of Hydrogen Sulfide from Hydrocarbon Liquids Using a Caustic Solution*, Energy Sources, Part A: Recovery, Utilization, and Environmental Effects, 37:791-798, 2015, discuss that: the known methods include amine processes involving monoethanolamine (MEA), triazine, etc., treatment involving use of caustic material, iron oxide process, zinc oxide, molecular sieve, potassium hydroxide, and a hydrodesulphurization process; the amine treatment is usually the most cost effective choice for gas sweetening when significant amounts of acid gases exist; scrubbing of hydrogen sulfide using sodium hydroxide solution is a well established technology in refinery applications; caustic wash process is commonly used as a preliminary step in sweetening liquid hydrocarbons; and since the used solvent in this process cannot be easily regenerated, caustic scrubbers are most often applied where low acid gas ($H_2S$) volumes must be treated.

$H_2S$ abatement achieved by a conventional amine treatment process uses an amine such as monoethanolamine (MEA) or triazine for treating $H_2S$ in crude oil. See, for example, U.S. Pat. No. 8,562,820 which discloses a formulation of triazine which is specially suited for treatment of hydrocarbon liquids for remediating the $H_2S$ and other sulfur containing compounds therein. However, the conventional amine treatment process may not be effective for remediating $H_2S$ in crude oil containing paraffin and other waxes and in oil containing more than 200 ppm $H_2S$. Further, the conventional triazine treatment for $H_2S$ generally requires a significant amount of triazine for treating $H_2S$, e.g., the required amount of triazine may be 10 times the amount of $H_2S$ in the contaminated liquid, and hence results in a relatively high treatment cost. Also, while the $H_2S$ may be initially remediated or abated down to acceptable levels, the resulting sulfur compounds that remain in the treated oil may undesirably revert back to $H_2S$ over time, especially if the treated oil is heated. Somewhat similarly, it is also known that there are bacteria which ingest sulfur compounds, and hence may reduce the amounts of sulfur contaminants in hydrocarbon based liquids or contaminated aqueous solutions. However, when the bacteria die and decompose this undesirably releases the sulfur back into the hydrocarbon based liquids or contaminated aqueous solutions.

The present inventors have proposed other treatment compositions and processes for remediating $H_2S$ and other contaminants in various contaminated liquids such as crude oil and aqueous solutions such as solutions extracted from the earth along with crude oil and in natural gas. See, for example, International Application Nos. PCT/US2018/050913 and PCT/US2018/064015. These prior proposals are very effective at quickly remediating $H_2S$, even at very high concentrations, e.g., 100.000 ppm or more.

One of the inventors' prior proposals as set forth in PCT/US2018/050913 involves an aqueous treatment solution containing primarily a high concentration of one or more hydroxide compounds such as sodium hydroxide (NaOH), potassium hydroxide (KOH), etc., e.g., collectively the hydroxides account for 35-55 weight percent, and preferably at least 45 weight percent of the treatment solution, which efficiently react with $H_2S$ to convert it to non-toxic substances. Such treatment solution according to the recent proposal is highly alkaline with a pH of 13-14. In such treatment process a relatively small dosage of the treatment solution is added to the hydrocarbon based liquids or aqueous solutions being treated, e.g., at a standard dosage rate of 0.25-6.0 ml of the treatment solution/liter of the liquid being treated, preferably 1.0-5.0 ml of the treatment solution/liter of the liquid being treated, which corresponds to approximately 125-3000 ppm of hydroxide(s) in the liquid being treated. A particularly appropriate dosage rate for a given contaminated liquid depends on multiple factors, but the hydroxide(s) in the solution efficiently remediate the $H_2S$ and other sulfur-containing compounds down to acceptable levels within relatively short time periods such as 15 minutes to a few hours, and without otherwise detrimentally affecting the hydrocarbon-petroleum based liquids or contaminated aqueous solutions in any significant manner. The recently proposed treatment solution may further include one or more other components depending on the specific characteristics of the liquids being treated and other factors relating to the remediation treatment process. For example, the treatment solution may include a silicate such as potassium silicate ($K_2SiO_3$) or barium (Ba) as an antibacterial agent, but the high concentration of hydroxide(s) in the treatment solution is a primary characteristic of the solution because this is important for efficient remediation of $H_2S$ by the hydroxide(s) in the liquids being treated.

Another of the inventors' proposals as set forth in PCT/US2018/064015 involves use of a treatment liquid substantially according to the first proposal together with an appropriate amount of one or more organic acids such as fulvic acid and humic acid, which function to assure that no precipitates, scale or the like are released from the remediated liquids. A dosage rate of the organic acid(s) is one that will typically result in a concentration of the organic acid(s) in the liquid being treated being in a normal range of 0.01-10 ppm, preferably 0.1-3 ppm, whether the liquid is a hydrocarbon based liquid or contaminated aqueous solution. A small amount of monoethanolamine or MEA ($C_2H_7NO$) may also be included in the treatment composition to help prevent scale formation from the remediated liquids. e.g., an amount corresponding to a concentration of 0.5-15 ppm, and preferably 1.0-10 ppm, of the MEA in the hydrocarbon based liquid or aqueous solution being treated. The organic acid(s) such as fulvic acid and humic acid are effective to bind to the remediated contaminants and maintain them in the treated liquids without forming any precipitates while the liquids are being treated, transported and/or stored for a period of time such as hours, days or weeks, which is very important sometimes, while MEA also helps prevent scale formation from the remediated liquids.

Fulvic acid is actually a family of organic acids, but may typically be identified as 1H,3H-Pyrano[4,3-b][1]benzopyran-9-carboxylic acid, 4,10-dihydro-3,7,8-trihydroxy-3-methyl-10-oxo-; 3,7,8-trihydroxy-3-methyl-10-oxo-1,4-dihydropyrano[4,3-b]chromene-9-carboxylic acid, with an average chemical formula of $C_{135}H_{182}O_{95}N_5S_2$ and molecular weights typically in a range of 100 to 10,000 g/mol. Somewhat similarly, humic acid is a mixture of several molecules, some of which are based on a motif of aromatic nuclei with phenolic and carboxylic substituents, linked together, and the illustration below shows a typical structure. Molecular weight (size) of humic acid is typically much larger than that of fulvic acid, and can vary from 50,000 to more than 500,000 g/mol. An example of a humic acid molecule is shown below.

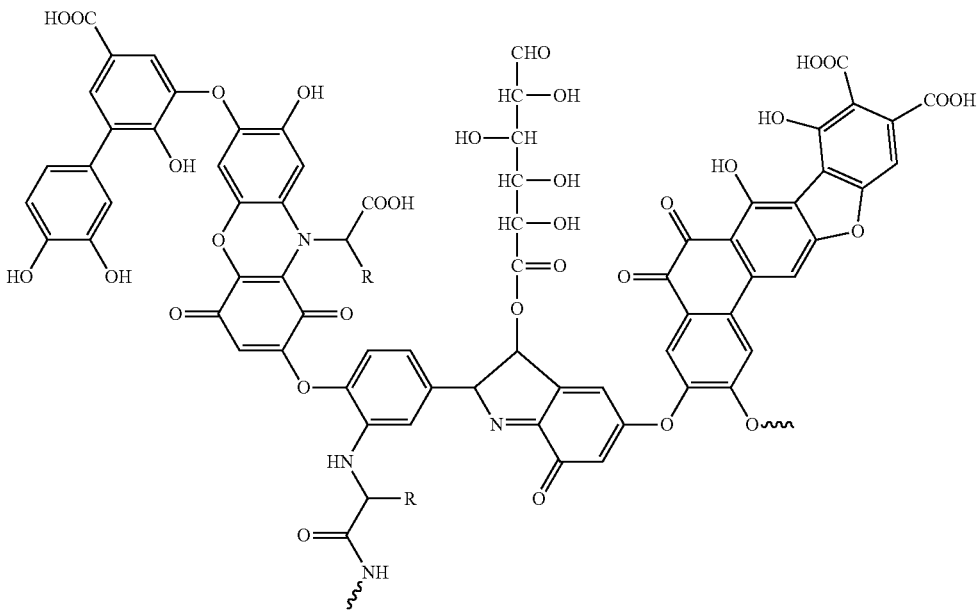

While the inventors' previously proposed treatment compositions and processes are very efficiently and effectively for remediating $H_2S$ and other contaminants in the contaminated liquids, and are much more effective and efficient than other conventionally known treatment solutions and processes known prior to the inventors' proposals, the present inventors' previously proposed compositions and processes may not be the most cost effective for treating contaminated liquids which contain low to moderate amounts of $H_2S$ and other contaminant(s), e.g., $H_2S$ concentrations of 2000 ppm or less, especially 500 ppm or less, which constitutes a majority of the crude oil and other hydrocarbon based and aqueous based liquids that need to be remediated. Again, the inventors' prior proposals are effective to quickly remediate contaminated liquids containing much higher levels of $H_2S$ and other contaminant(s) within a relatively short time of a few hours or less, but such rapid remediation of high contamination levels may not be required in many instances. Correspondingly, the previously proposed treatments may not be the most efficient manner of treating liquids with low or moderate levels of contamination in terms of cost, in terms of any amounts of the treatment solution that may remain unreacted in the treated liquids, etc. Hence there is a desideratum in for a lower cost treatment composition and treatment solution which provides many of the advantages of the inventors' previously proposed treatment composition and treatment methods, but which has lower cost and may be used for remediating low to moderate levels of $H_2S$ in crude oil and other liquids.

SUMMARY OF THE INVENTION

It is an object of the present invention to fulfill the discussed desideratum.

The inventors have further studied the treatment of contaminated liquids which contain low to moderate amounts of $H_2S$ and other contaminant(s) in light of the foregoing, and the inventors have discovered a new treatment composition and a new treatment process which is much more cost effective for remediating low to moderate levels of $H_2S$ and other contaminant(s) in contaminated liquids such as crude oil and the contaminated water extracted from the earth with crude oil, e.g., $H_2S$ concentrations of 2000 ppm or less, especially 500 ppm or less, but which is still very effective for remediating the $H_2S$ and other contaminant(s) down to acceptable levels in reasonably short time periods. The new treatment composition is aqueous based like the composition disclosed in PCT/US2018/064015 and may include two primary components of the treatment composition as disclosed in PCT/US2018/064015, i.e., one or more hydroxide compounds and one or more organic acids such as fulvic acid and humic acid, together with a chelating agent such as ethylenediaminetriaceticacid (EDTA) and possibly a small amount of a surfactant.

However, in a treatment process involving the new treatment composition, the effective amount of the treatment composition added per unit of contaminated liquid is much less than the effective amount of the treatment solution used in the treatment process as disclosed in PCT/US2018/064015, e.g., by a factor of about 1:7.5 to 1:20. The new treatment composition may, for example, be prepared by combining amounts of the hydroxide compounds (s) and the organic acid(s) similar to the amounts of these compounds in the treatment composition in PCT/US2018/064015, together with an amount of chelating agent and possibly a surfactant, together with a with a large volume of water sufficient to achieve the treatment composition at a desired concentration of the chemical reactants which is about 1:7.5 to 1:20 to the concentration of the chemical reactants in the treatment solution as disclosed in PCT/US2018/064015. The inventors have discovered that crude oil and other contaminated liquids with low to moderate amounts of $H_2S$, e.g., of 2000 ppm or less, and other contaminant(s) may be effectively and efficiently treated/remediated in a relatively short time period by a treatment method according to the present invention in which a dosage of 0.05-15 ml, preferably 0.5-5.0 ml of the new, less concentrated treatment composition is added/liter of contaminated liquid and permitted to react with the $H_2S$ and other contaminant(s) over a relatively short time period such as 30 minutes-twenty four hours. Conveniently, because the new treatment composition according to the present invention is relatively dilute, it is possible to initially prepare a more concentrated version of the treatment composition, then transport the treatment solution in concentrated form to a desired location, such as a given oil well, and then dilute the composition with potable water to its desired concentration at the location before adding appropriate amounts of dilute treatment composition to the contaminated liquid being treated. Further, while it is appropriate to combine all of the components of the treatment composition together before the treatment solution is added to a contaminated liquid, it is also possible to separately add one or more of the components to the contaminated liquid, and either way the treatment process will be effective for efficiently and effectively remediating the $H_2S$ and other contaminants in the contaminated liquids within a reasonably short time period.

Also, while the new treatment composition may be prepared in a diluted form as discussed above, an alternative treatment composition and treatment process according to the present invention may involves preparing a concentrated version of the treatment composition which is not diluted with water, and then a much smaller volume of the concentrated treatment solution is added per unit of the contaminated liquid, e.g., a dosage of 0.005-1.5 ml, preferably 0.05-0.5 ml of the new concentrated treatment composition is added/liter of contaminated liquid. The effective dosage amounts of the chemical reactants used in this treatment process would be the same as the effective dosage amounts of these chemical reactants used in the treatment process using the diluted treatment composition, but significantly less water would be used—added to the liquid being treated.

INTENT OF DISCLOSURE

Although the following disclosure of exemplary embodiments of the invention offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

DETAILED DESCRIPTION OF PRESENT EXEMPLARY EMBODIMENTS

Exemplary embodiments of the present invention will be described below. Primary aspects of the present invention involve use of novel treatment compositions in treatment processes for contaminated liquids containing $H_2S$ wherein the treatment compositions are combined/mixed with the contaminated liquids and permitted to react over a period of time until the amount of $H_2S$ remaining in the liquids is less than 5 ppm.

According to a exemplary embodiment of the present invention, a novel treatment composition for remediating for remediating low to moderate amounts of $H_2S$ and other contaminant(s) in contaminated liquids comprises: a relatively dilute aqueous solution containing mostly water, together with much lower concentrations of hydroxide compound(s) and organic acid(s) than in the treatment solution as disclosed in PCT/US2018/064015, an amount of a chelating agent such as EDTA, and optionally a small amount of surfactant. For example, a treatment composition according to an exemplary embodiment of the present invention may contain at least 70% weight of water, and preferably at least 90% weight of water, together with: 0.1-10.0 weight % collectively of at least one hydroxide compound; 0.01-3.0 weight % collectively of at least one organic acid including as fulvic acid, humic acid and the like; 0.05-10.0 wt % of a chelating agent such as EDTA; and optionally 0.001-0.2 wt % of surfactant such as sodium lauryl sulphate. A pH of the treatment composition may be approximately 14.0.

In the novel treatment composition according to this embodiment of the present invention, the collective concentration of the hydroxide compound(s), the organic acid(s), the chelating agent and/or surfactant may be adjusted within the discussed ranges depending on the amounts of $H_2S$ and other contaminants in the liquid being treated, as well as on other factors including specific reaction rate desired and other contaminants in the liquid being treated.

The novel treatment composition according to this embodiment of the present invention includes hydroxide compound(s) as the primary reactant for reacting with the $H_2S$ in the liquid being treated to remediate same according to the same reactions as discussed in PCT/US2018/064015, e.g., if sodium hydroxide (NaOH) is one of the hydroxide compound(s), the water and NaOH dissociates $H_2S$ to HS— ion at higher pH, which shifts the equilibrium of $H_2S$ gas from oil to water, then, the HS— can react with sodium to form NaHS (sodium bisulfide), or with $S_2$— to form $Na_2S$ (sodium sulfide), for example, plus water as a byproduct according to the following equations.

$$H_2S + NaOH \rightarrow NaHS + H_2O \quad (1)$$

$$NaHS + NaOH \rightarrow Na_2S + H_2O \quad (2)$$

If other hydroxide compounds are included in the treatment solution they will react similarly with the $H_2S$ to remediate same. As noted in PCT/US2018/064015, the treatment composition and associated treatment process may involve use of only one hydroxide such as sodium hydroxide (NaOH) or potassium hydroxide (KOH), but may also involve use of a combination of hydroxides for more completely reacting with most or some of the other contaminants in the petroleum based liquids, noting that there are more than 300 species of sulfur compounds, although hydrogen sulfide $H_2S$ is by far the main contaminant that must be remediated. It should be noted that the diluted treatment composition according to the present invention is also different from the more concentrated treatment composition disclosed in PCT/US2018/064015 in relation to remediating many common contaminants found in crude oil besides $H_2S$. For example, while the treatment composition disclosed in PCT/US2018/064015 is also very effective at remediating many other sulfur based contaminants besides $H_2S$, the new dilute treatment composition is not very effective at remediating some other species of undesirable sulfur compounds including ethyl mercaptan ($CH_3CH_2SH$), dimethyl sulfide ($C_2H_6S$), isobutyl mercatan ($C_4H_{10}S$) and components thereof.

Sodium hydroxide is very effective for use as a hydroxide compound in the treatment solution according to the present invention because it does not harm the petroleum based liquids when used in appropriate amounts, and is relatively inexpensive. Potassium hydroxide is more effective than sodium hydroxide for reacting with some species of sulfides. Hence, the treatment process involving potassium hydroxide (KOH) together with the sodium hydroxide achieves a more complete reaction with all of the sulfides contained in the hydrocarbon based liquids in comparison to just using a concentrated solution of sodium hydroxide. Some other hydroxide compounds that may be suitable for use in the treatment composition and treatment process of the present invention include magnesium hydroxide ($Mg(OH)_2$), ammonium hydroxide ($NH_4OH$), and manganese hydroxide ($Mn(OH)_2$, $Mn(OH)_4$), but the present invention is not limited to any particular hydroxide compound(s) as long as the compounds are effective for remediating $H_2S$ and other targeted contaminants. Another consideration in selecting the hydroxide compounds is that they should not contain element(s)/component(s) that are also included as a significant contaminant in the liquid being treated. For example, if the liquid contains a significant amount of sodium chloride as a contaminant, then the hydroxide compound(s) in the treatment solution it would be preferred to use a hydroxide other than sodium hydroxide, e.g., potassium hydroxide (KOH), magnesium hydroxide ($Mg(OH)_2$), ammonium hydroxide ($NH_4OH$), and manganese hydroxide ($Mn(OH)_2$, $Mn(OH)_4$) would be suitable hydroxides for use in this situation. Also, a given hydroxide compound or a given combination of hydroxide compounds may achieve a faster and/or more efficient reaction with $H_2S$ and other contaminants in a given contaminated liquid.

It should be noted that equation (2) above is reversible, so large amounts of water hydrolyze the sodium sulfide ($Na_2S$) back to NaOH and NaHS. In other words, equation (2) in the reverse direction is a hydrolysis reaction. However, because the treatment composition according to the present invention includes the organic acid(s) such as fulvic acid and humic acid, as well as a chelating agent such as EDTA, these desirably prevent the reactions between the hydroxide compound(s) and $H_2S$ from being reversible.

The organic acids such as fulvic acid and humic acid in the treatment composition are very effective for binding with the sulfur ions, and sulfur based compounds resulting from the remediation of $H_2S$ and other species of sulfur based contaminants in the contaminated liquid and for preventing the resulting surfur compounds and other contaminants from precipitating out of the treated crude oil or other treated liquid. The fulvic acid and humic acid will pick up sulfide ions ($HS^-$ or $S_2^-$) as a scavenger. There is presently no analytical method for identifying all sulfur species in a reaction of $H_2S$ (including $HS^-$ or $S_2^-$) with fulvic or humic acid. Fulvic acid is not one molecule, but a mixture of organic molecules of different structures with various aliphatic and aromatic hydrocarbon with carbonyl and hydroxyl functional groups that can react with HS— and $S_2$—. The same applies to humic acid. In the natural environment, fulvic acid and humic acid are known to pick up sulfur in biogeochemical cycling processes to form organic sulfides, thiols and thiophenes, sulfoxides, polysulfones and sulfonates. Likewise, when sulfur in a contaminated liquid reacts in a solution containing fulvic acid and/or humic acid, the number and complexity of these compounds makes it difficult to speciate and the results will be different based on other variables such as pH, redox potential, and the presence of other compounds in the solution including impurities in contaminated liquid that can react with and/or bond to fulvic acid or humic acid. These organic acids help in two ways, i.e., they bind sulfur as an irreversible scavenger of sulfur (i.e., once bound, a drop in pH does not return the sulfur to $H_2S$), and it also helps to keep solids in solution (i.e. it is a solubility enhancer).

In the novel treatment composition according to the exemplary embodiment of the present invention, the chelating agent used may be ethylenediaminetriaceticacid (EDTA). EDTA is particularly effective for controlling the pH of the treatment composition to remain above 8 in that EDTA is an alkali base with a PH of 14 and slows the decrease of the pH of the treatment composition as it is used over a period of time. Essentially the EDTA increases the molar concentration performance of the alkali (hydroxide(s)) in the remediation of $H_2S$ and the reaction of other sulfur speciation compounds along with the other reactive contaminants. This is advantageous because the high pH favors reaction between the hydroxide compound(s) and the $H_2S$ in the contaminated liquid, such that a given amount of the treatment composition can be effectively used for remediating more of the $H_2S$ in comparison to an equal amount of treatment composition which does not include EDTA. In other words, the EDTA or other chelating agent effectively increase the reactivity of the other components in the treatment composition and extends the useful life of the treatment composition. Incidentally, EDTA has been conventionally used in other treatment processes as a primary reactant in a method of mitigating $H_2S$ in a contaminated liquid. However, according to the conventional treatment processes involving EDTA the required molar reaction time is long and the molar reaction ratio may be about 1 mole EDTA to 1 mole $H_2S$, such that high concentrations of $H_2S$ would require large doses of EDTA for a long treatment period, which may not be desirable. While use of a chelating agent such as EDTA is not required for the treatment solution and treatment method according to the present invention to be effective, it may be helpful to achieve a more efficient and cost effective treatment of the contaminated liquids.

The contaminated liquids which may be treated using the treatment composition in a treatment process according to the present invention can be essentially any hydrocarbon based or aqueous based liquids. For example, hydrocarbon based liquids may have a viscosity or API density (the term API as used herein, is an abbreviation for American Petroleum Institute) across a broad range, e.g., from a very dense/viscous substance such as asphaltene to far less viscous/dense substances such as blends of napthas of liquids with an API of about 80. Of course, for some of the very dense/viscous liquids, it may be necessary to heat and/or mix the liquid in order to sufficiently disperse the treatment solution throughout the liquid so that it may sufficiently and efficiently react therewith in a reasonable time.

A treatment process according to an exemplary embodiment of the present invention may involve adding a standard dosage of the inventors' recently proposed treatment composition per unit volume of the contaminated liquid, i.e., a dosage within a range of 0.05-15 ml, preferably 0.5-5.0 ml of the new, dilute treatment composition/liter of contaminated liquid, and then simply letting the treatment composition react with the $H_2S$ and other targeted contaminants for period of time such as 30 minutes-24 hours. The inventors have found that treatment process is very effective for safely and efficiently remediating the low to moderate levels of $H_2S$, e.g., about 2000 ppm or less, and other targeted contaminants therein down to appropriate levels of less than 5 ppm within such time period without creating precipitates to be released from the treated liquids and without causing any significant problems for the treated liquids. The most appropriate dosage rate within the discussed range for the treatment composition, as well as for each of the components thereof, will be based on specific characteristics of the contaminated liquid being treated, but not so dependent on whether the liquid is a hydrocarbon based liquid or contaminated aqueous solution. Within such range, the most appropriate dosage rate largely depends on: 1) the amount of $H_2S$ and other targeted contaminants in the liquid being treated; 2) the viscosity of the liquid; and 3) the amount of time permitted for reacting the treatment composition with the liquid being treated. Heating and/or mixing of the liquid being treated may also be important considerations because heating and/or mixing of the liquid being treated will typically reduce the viscosity of the liquid and will also reduce the amount of time required for dispersing the treatment composition throughout the contaminated liquid for properly remediating the $H_2S$ and other targeted contaminants in the liquid. The dosage amount of treatment composition and each of its components are substantially, linearly scalable within the discussed range based on these factors.

Other considerations regarding the dosage amount for a given contaminated liquid as discussed in PCT/US2018/064015 regarding the amounts of hydroxide compound(s) and organic acid(s) in the treatment solution also generally apply to the treatment solution according to the exemplary embodiment of the present invention. However, given that the dilute treatment composition according to the exemplary embodiment of the present invention contains a significantly larger proportion of water and less of the reactive compounds than the treatment composition of PCT/US2018/064015, it is important that the total water content of treated hydrocarbon based liquids such as crude oil not exceed 0.5 volume % because this could render the treated crude oil not marketable and valuable. Hence, if the contaminated liquid contains relatively higher amounts of $H_2S$, e.g., exceeding 2000 ppm, it may be more appropriate to a less diluted version of the treatment composition according to the exemplary embodiment of the present invention or a treatment composition as disclosed in PCT/US2018/064015 rather than a fully treatment composition according to the present invention for treating the contaminated liquid.

Examples

An example of an aqueous treatment composition according to the exemplary embodiment of the present invention may be prepared as follows. In an appropriate size container combine: 20-50 gallons of a concentrated aqueous solution containing 35-55 wt % collectively, preferably 45-55 wt % collectively, of one or more hydroxide compounds such as NaOH and KOH; 2-5 gallons of an aqueous solution containing about 1-10 wt % collectively of one or more organic acids such as fulvic acid and humic acid; 2-5 gallons of an aqueous solution containing 25-50 wt % of EDTA; and optionally 0.1-1 gallon of surfactant such as sodium lauryl sulphate, together with an amount of water to generate 330 gallons of the treatment composition. Again, timing for when some or all the amount of water is added to the other components may be delayed until the other components are brought to a location where the treatment composition is to be added to the contaminated liquid being treated, e.g., at a given oil well.

A example of treatment process using an aqueous treatment composition according to the exemplary embodiment of the present invention to treat crude oil containing about 2000 ppm of $H_2S$ involves the steps of: 1) adding 5 ml of the treatment composition as prepared in the example of the preceding paragraph to a volume of contaminated crude oil contained in a closed vessel such as a tanker truck at a dosage rate of 5 ml of the treatment composition/liter of the crude oil; and 2) allowing the treatment composition to react with the $H_2S$ for a period of 15 minutes to 24 hours or until the concentration of $H_2S$ remaining in the crude oil is less than 5 ppm. Thus treated, the crude oil is safe for being transported to a refinery and the remediated $H_2S$ and other contaminants in the crude oil will remain in the crude oil without precipitating and being released from the treated crude oil.

INTENT OF DISCLOSURE

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

The foregoing description is given for clearness of understanding only, and no unnecessary limitations should be understood therefrom, as modifications within the scope of the invention may be apparent to those having ordinary skill in the art and are encompassed by the claims appended hereto. For example, while the exemplary embodiment of the treatment composition is a relatively dilute aqueous solution containing a large proportion of water, an alternative treatment composition and treatment process according to the present invention may involves preparing a concentrated version of the treatment composition which is not diluted with water, and then a much smaller volume of the concentrated treatment solution is added per unit of the contaminated liquid, e.g., a dosage of 0.005-1.5 ml, preferably 0.05-0.5 ml of the new concentrated treatment composition is added/liter of contaminated liquid. The effective dosage amounts of the chemical reactants used in this treatment process would be the same as the effective dosage amounts of these chemical reactants used in the treatment process using the diluted treatment composition, but significantly less water would be used-added to the liquid being treated. As another example, it is possible to include other components in the treatment composition of the exemplary embodiment, such as MEA as an anti-scaling agent, an antibacterial such as a sulfite compound, etc.

We claim:

1. A treatment composition for remediating $H_2S$ and other contaminant(s) in contaminated liquids, comprising: 0.1-10.0 weight % collectively of at least one hydroxide compound; 0.01-3.0 weight % collectively of at least one organic acid selected from a group consisting of fulvic acid and humic acid; 0.01-10.0 wt % of a chelating agent; and at least 75% weight of water.

2. The treatment composition according to claim 1, wherein the chelating agent is EDTA, and the hydroxide compound(s) include at least one of sodium hydroxide and potassium hydroxide.

3. The treatment composition according to claim 1, further comprising 0.001-0.2 weight % of surfactant.

4. The treatment composition according to claim 3, wherein the surfactant comprises sodium lauryl sulphate.

5. The treatment composition according to claim 1, wherein water constitutes at least 90 wt % of the treatment composition.

6. The treatment composition according to claim 1, wherein a pH of the composition is about 14.0.

7. A treatment process for remediating $H_2S$ in a contaminated liquid, comprising steps of adding 0.05-15 ml of the treatment composition according to claim 1/liter of contaminated liquid, and allowing the treatment composition to react with the $H_2S$ and other contaminant(s) in the contaminated liquid for a sufficient time to permit the amounts of the $H_2S$ in the contaminated liquid to be reduced down to less than 5 ppm, wherein an amount of $H_2S$ in the contaminated liquid prior to addition of the treatment composition is in a range of 5 to 2000 ppm.

8. The treatment process according to claim 7, wherein in the adding step 0.5-2.0 ml of the treatment composition is added/liter of the contaminated liquid.

9. The treatment process according to claim 7, wherein the amount of $H_2S$ in the contaminated liquid prior to addition of the treatment composition is in a range of 5 to 500 ppm.

10. The treatment process according to claim 7, wherein the chelating agent is EDTA, and the hydroxide compound(s) include at least one of sodium hydroxide and potassium hydroxide.

11. The treatment process according to claim 7, wherein the treatment composition further comprises 0.001-0.2 weight % of surfactant.

12. The treatment process according to claim 11, wherein the surfactant comprises sodium lauryl sulphate.

13. The treatment process according to claim 7, wherein water constitutes at least 90 wt % of the treatment composition.

14. The treatment process according to claim 7, wherein a pH of the composition is about 14.0.

* * * * *